(12) United States Patent
Ahn et al.

(10) Patent No.: US 8,139,549 B2
(45) Date of Patent: Mar. 20, 2012

(54) METHOD OF SCHEDULING AN UPLINK PACKET TRANSMISSION CHANNEL IN A MOBILE COMMUNICATION SYSTEM

(75) Inventors: Joon Kui Ahn, Seoul (KR); Hak Seong Kim, Seoul (KR); Seung Hwan Won, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 413 days.

(21) Appl. No.: 12/457,763

(22) Filed: Jun. 19, 2009

(65) Prior Publication Data

US 2009/0262711 A1 Oct. 22, 2009

Related U.S. Application Data

(63) Continuation of application No. 11/097,011, filed on Mar. 31, 2005, now Pat. No. 7,551,625.

(30) Foreign Application Priority Data

Apr. 2, 2004 (KR) .............................. 10-2004-22960

(51) Int. Cl.
*H04J 3/00* (2006.01)
(52) U.S. Cl. ........................................ 370/336
(58) Field of Classification Search .................. 370/336
See application file for complete search history.

(56) References Cited

U.S. PATENT DOCUMENTS

| 5,526,357 A | 6/1996 | Jandrell |
| 5,550,575 A | 8/1996 | West et al. |
| 5,862,452 A | 1/1999 | Cudak et al. |
| 6,452,915 B1 | 9/2002 | Jorgensen |
| 6,654,377 B1 | 11/2003 | Pasternak et al. |
| 6,993,347 B2 | 1/2006 | Bodin et al. |
| 7,013,143 B2 | 3/2006 | Love et al. |
| 7,209,749 B2 | 4/2007 | Kwak et al. |
| 7,236,738 B2 | 6/2007 | Settle |
| 7,321,780 B2 | 1/2008 | Love et al. |
| 7,343,487 B2 | 3/2008 | Lindqvist et al. |
| 7,397,790 B2 | 7/2008 | Zeira et al. |

(Continued)

FOREIGN PATENT DOCUMENTS

CN 1328759 12/2001

(Continued)

OTHER PUBLICATIONS

3rd Generation Partnership Project, "Technical Specification Group Radio Access Network; Feasibility Study for Enhanced Uplink for UTRA FDD", Release 6, V2.0.0, Mar. 2004.

(Continued)

*Primary Examiner* — Gary Mui
*Assistant Examiner* — Richard K Chang
(74) *Attorney, Agent, or Firm* — McKenna Long & Aldridge LLP

(57) ABSTRACT

A method of scheduling an uplink packet transmission channel in a mobile communication system is disclosed. The method of scheduling includes determining a scope of user equipments (UEs) to be applied to a scheduling assignment for scheduling the uplink packet transmission channel, and transmitting the scheduling assignment to the user equipments included in the determined scope, wherein the scheduling assignment includes an identifier for identifying the scope of the user equipments and scheduling contents for carrying information applicable to the scheduling assignment.

19 Claims, 3 Drawing Sheets

U.S. PATENT DOCUMENTS

| | | |
|---|---|---|
| 2003/0013451 A1 | 1/2003 | Walton |
| 2003/0105809 A1 | 6/2003 | Yoshii et al. |
| 2003/0228865 A1 | 12/2003 | Terry |
| 2004/0042435 A1 | 3/2004 | Soomro et al. |
| 2004/0071115 A1 | 4/2004 | Earnshaw et al. |
| 2004/0131106 A1* | 7/2004 | Kanterakis .................... 375/141 |
| 2004/0219919 A1* | 11/2004 | Whinnett et al. ............. 455/442 |
| 2005/0025100 A1 | 2/2005 | Lee et al. |
| 2005/0207359 A1 | 9/2005 | Hwang et al. |
| 2007/0011334 A1 | 1/2007 | Higgins et al. |

FOREIGN PATENT DOCUMENTS

| | | |
|---|---|---|
| CN | 1379600 | 11/2002 |
| EP | 1294212 | 3/2003 |
| KR | 10-2003-0005898 | 1/2003 |
| RU | 2 198 475 | 2/2003 |
| WO | WO 99/41918 | 8/1999 |
| WO | WO 00/14900 | 3/2000 |
| WO | WO 03/094550 | 11/2003 |
| WO | WO 03/094554 A1 | 11/2003 |

OTHER PUBLICATIONS

Siemens: "Node B controlled rate scheduling by fast UE transmission power limitation", R1-030791, TSG-RAN WG1 #33, Aug. 25, 2003.

Motorola, et al.: "Node B controlled Time and Rate Scheduling", R1-030592, TSG-RAN WG1 #32, May 19, 2003.

* cited by examiner

METHOD OF SCHEDULING AN UPLINK PACKET TRANSMISSION CHANNEL IN A MOBILE COMMUNICATION SYSTEM

This application is a continuation of U.S. patent application Ser. No. 11/097,011, filed on Mar. 31, 2005 now U.S. Pat. No. 7,551,625, which claims the benefit of Korean Application No. P2004-22960, filed on Apr. 2, 2004, all of which are hereby incorporated by reference in their entirety for all purposes as is set forth herein.

BACKGROUND OF THE INVENTION

1. Field of the Invention

The present invention relates to a method of scheduling in wireless packet communication system, and more particularly, to a method of scheduling uplink packets in wireless communication system. Although the present invention is suitable for a wide scope of applications, it is particularly suitable for transmitting scheduling information to specified groups of subscribers or to all subscribers.

2. Discussion of the Related Art

With increasing demand in speed and size of uplink transmission, methods of high-speed packet communication during the uplink from a mobile device to a base station are widely being discussed. E-DCH (Enhanced uplink Dedicated CHannel) of 3GPP WCDMA ($3^{rd}$ Generation Partnership Project, Wideband Code Division Multiple Access) is an example of one of the methods being discussed.

The E-DCH incorporates existing methods such as uplink packet scheduling from Node B (base station) in the 3GPP WCDMA uplink DCH (Dedicated CHannel) and HARQ (Hybrid Automatic Retransmission reQuest) in the Physical Layer (PHY) to increase the efficiency of uplink transmission. Through efficient construction of scheduling assignment from Node B, the system processing rate is increased.

Node B controlled scheduling is one of the methods that is applicable to the existing 3GPP WCDMA E-DCH. According to current discussions on standards, techniques such as Time Division Multiplex (TDM), Code Division Multiplex (CDM), or time and code division multiplex can be used to transmit Node B scheduling assignment (Similar to High Speed Downlink Packet Access (USDPA)). If any of the three techniques are used, scheduling assignment transmitted to each user equipment (UE) contains at least UE classification identification (UE ID) and the contents of scheduling assignment.

Each UE inspects the downlink channel which is used to transmit scheduling assignment via UE ID. If the UE ascertains that the scheduling assignment transmitted as a part of UE ID is correctly addressed, the UE acquires the contents of the scheduling assignment. According to the scheduling assignment, the UE starts, terminates, or holds transmission. Since the scheduling assignment is transmitted from Node B to each UE, a substantial amount of time is required to transmit the same scheduling assignment to a specified group of UEs or to all the UEs.

As discussed above, scheduling assignments are independently transmitted using time division, code division, or time-code division techniques to each UE. Consequently, a problem arises in transmitting scheduling assignments to a specified group(s) of UEs or to all the UEs in the PHY. In addition, transmitting using such techniques to individual UE causes traffic congestion due to sudden increase in uplink traffic in the PHY and cannot be dealt with quickly.

SUMMARY OF THE INVENTION

Accordingly, the present invention is directed to a method of scheduling an uplink packet transmission channel in a mobile communication system that substantially obviates one or more problems due to limitations and disadvantages of the related art.

An object of the present invention is to provide a method of scheduling an uplink packet transmission channel in a base station of a mobile communication system.

Another object of the present invention is to provide a method scheduling an uplink packet transmission channel to efficiently deal with communication traffic congestion problems.

A further object of the present invention is to provide a method of scheduling an uplink packet transmission channel to transmit scheduling assignment, not only to individual user equipments, but also to a group of user equipments and/or to all user equipments.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of scheduling an uplink packet transmission channel in a base station is provided. In the method of scheduling an uplink packet transmission channel, a scope of user equipments (UEs) of a scheduling assignment for scheduling the uplink packet transmission channel is determined. Furthermore, the scheduling assignment to user equipments included in the determined scope is transmitted. Also, the scheduling assignment includes an user equipment identifier which identifies the scope of the user equipments, and scheduling contents for carrying information applicable to the scheduling assignment.

In another aspect of the present invention, a method of scheduling an uplink packet transmission channel in an user equipment (UE) is provided. In the method of scheduling an uplink packet transmission, The UE receives a scheduling assignment transmitted from a base station. Also, the scheduling assignment includes an user equipment identifier which identifies a scope of user equipments for the scheduling assignment. In addition, the scheduling assignment includes scheduling contents for carrying information applicable to the scheduling assignment and for transmitting packets through the uplink packet transmission channel according to the scheduling assignment.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
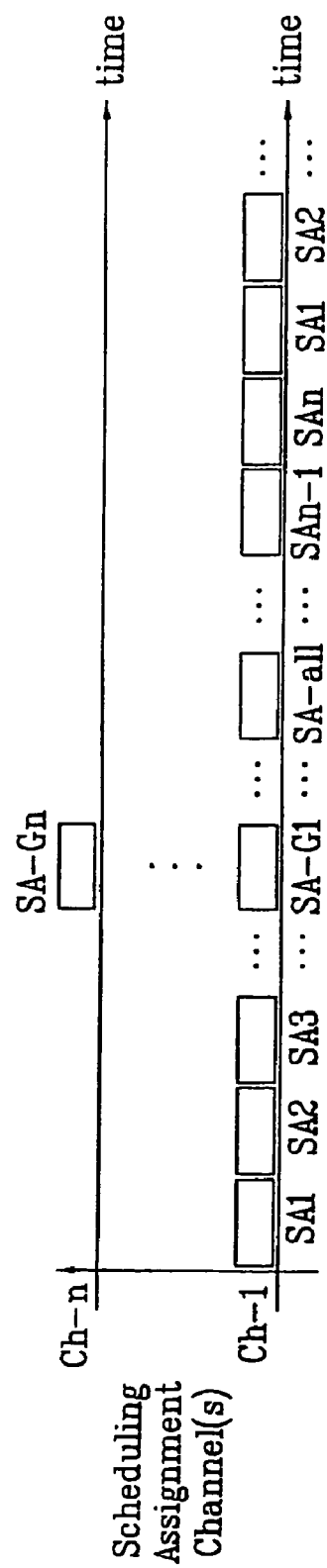
FIG. 1 shows scheduling assignment channels allocated along a timeline.

Reference will now be made in detail to the preferred embodiments of the present invention, examples of which are illustrated in the accompanying drawings. Wherever possible, the same reference numbers will be used throughout the drawings to refer to the same or like parts.

Although the preferred embodiment of the present invention relates to an E-DCH, the present invention can be applied to voluntary wireless packet communication system.

An Enhanced Absolute Grant Channel (E-AGCH) is a downlink channel used by a base station (Node B) to send a scheduling command to an user equipment (UE). In other words, Node B transmits a command as to how much transmission power or a level of data rate transmission an UE is permitted to transmit. This is also known as uplink scheduling assignment or scheduling assignment.

Under E-AGCH, each frame of the downlink transmission from Node B of scheduling assignment includes UE identifier (UE ID) and scheduling content. The UE ID is used to identify the receiving UE of the scheduling assignment for an uplink packet transmission.

The scheduling content includes various information such as scheduled power, duration, and priority. The scheduled power, also referred to as rate, defines a maximum amount of power that can be allotted for transmission of the uplink packet transmission. Furthermore, duration refers to how long the scheduling assignment remains effective in each UE while priority refers to a certain limitation assigned to the uplink packet transmission. For example, if Node B transmits a scheduling assignment to UE 1 with priority of C, where the order of alphabet starting with A indicating the highest priority of transmission, UE1 transmits when it is its time to transmit. In other words, UE1 transmits when it is time for UEs having priority C to transmit. Each scheduling assignment can also include any combination of information such as UE ID, scheduled power, and priority or UE ID, scheduled power, and duration.

In E-AGCH, scheduling assignment(s) can be transmitted from Node B via shared channel(s) to an UE, group(s) of UEs, or all the UEs. The transmitted scheduling assignment is then shared by all the UEs. In E-AGCH, the UEs of the shared channel receive and decode the transmitted scheduling assignment. After receipt and decoding of the scheduling assignment by the UEs of the shared channel, based on the UE ID included in a transmission packet of the scheduled assignment, the scheduled assignment is followed by the UE(s) whose ID corresponds to the ID(s) of the transmission. For example, assuming there are four UEs (UE1-UE4), Node B transmits via a shared channel a scheduling assignment, which applies only to UE1, to all four UEs. All four UEs receive, decode, and identify to which UE(s) the transmission is directed. In the transmission, in the packet of the scheduling assignment would contain an UE ID that corresponds only to the ID of UE1. Therefore, the scheduling assignment would be followed only by UE1 and not by any other UEs. This example could also apply to groups of UEs.

In addition, under E-AGCH, each UE can have more than one UE identifier. Here, each UE can have an identifier for a scheduling assignment directed to the corresponding UE, and another identifier for a scheduling assignment forwarded by another UE which received the initial scheduling assignment from Node B. In other words, an UE identifier for following a scheduling assignment transmitted from Node B as well as another UE identifier for following a scheduling assignment forwarded by another UE in the shared channel. Such forwarding of scheduling assignment can reduce and minimize transmission in the channel between Node B and UE(s). A number of identifiers an UE can possess is not limited to two identifiers as explained above but can have many more for various purposes.

For example, continuing from the previous example, after the UEs receive and decodes the scheduling assignment transmitted from Node B which is directed to UE4, the UE4 is further instructed to transmit the scheduling assignment to all UEs in the shared channel, i.e., UE1, UE2, UE3, and UE4. This time, the scheduling assignment is not from Node B but from another UE which received the initial assignment. Upon receipt of the scheduling assignment from UE4, all the UEs in the shared channel would receive and decode the assignment, as did with the assignment from Node B. Here, the scheduling assignment has identified UE1, UE2, and UE4 to follow. By having another UE identifier in each UE, Node B can direct the scheduling assignment intended for multiple UEs to a single UE and have that UE further transmit to other intended UEs so as to minimize transmission of the same scheduling assignment.

Under Enhance Relative Grant Access Channel (E-RGCH), unlike E-AGCH, Node B has a pre-allocated channel of transmission, and the scheduling assignment is transmitted accordingly. In E-RGCH, the scheduling assignment is comprised of at least 1 bit, and ID is not transmitted as part of the transmission packet information. Subsequently, the UE receiving the scheduling assignment via the pre-allocated channel reads and follows the assignment. For example, assuming there are four UEs (UE1-UE4), Node B transmits a scheduling assignment, which applies only to UE1, to only UE1. Because the transmission channels are pre-allocated, transmissions to the remaining UEs are not made.

In addition, E-RGCH is not limited to transmitting scheduling assignment to a single UE at a time. Under E-RGCH, it is possible to pre-allocate a plurality of channels to transmit a same scheduling assignment to a plurality of UEs. For example, continuing from the previous example, if Node B has pre-allocated channels 1 and 2 which apply to UE1 and UE2, respectively, to transmit the same scheduling assignment, the same scheduling assignment would then be transmitted only to UE 1 and UE2 and not to other UEs (UE3 and UE4). Only UE1 and UE2 would receive and follow the scheduling assignment.

As discussed above, the differences between E-AGCH and E-RGCH is clear. Under E-AGCH, a scheduling assignment is received by all UEs in a shared channel regardless to which UE the scheduling assignment is directed. However, the scheduling assignment would apply only to the UEs having the IDs corresponding to the IDs designated in the scheduling assignment. Under E-RGCH, the transmission channel(s) are pre-allocated by Node B, and only the UE(s) of the pre-allocated channel(s) would receive the scheduling assignment(s). The UE(s) not having been pre-allocated by Node B would not receive the scheduling assignment(s).

An embodiment of the present invention will be further explained with respect to E-AGCH. Node B utilizes various transmission techniques such as code division, time division, and code-time division methods to transmit scheduling assignment to UEs via scheduling assignment channels (Ch-1-Ch-n). The scheduling assignment includes contents and UE IDs' of each UE, UE IDs' of specified group(s), or an UE ID that applies to all the UEs uniformly. More specifically, scheduling content refers to the command transmitted from Node B to UEs which include information such as packet transmission power (Tx_Power), Transmit Format Combination (TFC), packet transmission time. As explained above, UE ID is an identifier used to identify an UE or a group of UEs for transmitting scheduling assignment.

The operation of Node B in determining the scheduling assignment for UE(s) is as follows. At each transmit time interval (TTI), Node B determines the status of the uplink packet transmission channel. To accomplish this, various techniques can be employed such as Signal-to-Noise Ratio (SNR), Signal-to-Interference-plus-Noise Ratio (SINR) and Rise over Thermal noise (RoT). For example, RoT can be used to determine the uplink channel status. Here, Node B determines the RoT value based on the status of the uplink channel. The determined RoT value is then compared to at least one critical value. A critical value is set in a manner not to exceed a maximum RoT value permitted in the communication system. Based on whether the determined RoT value exceeds the critical value, Node B determines whether to transmit scheduling assignment to each UE, group(s) of UEs, or all the UEs. Although one critical value was used in the above example, a plurality of critical values can be used to determine the method of transmitting scheduling assignment(s). Moreover, as discussed above, a method of determining the uplink channel status is not limited to using RoT, and other methods can be used.

Figure 3:
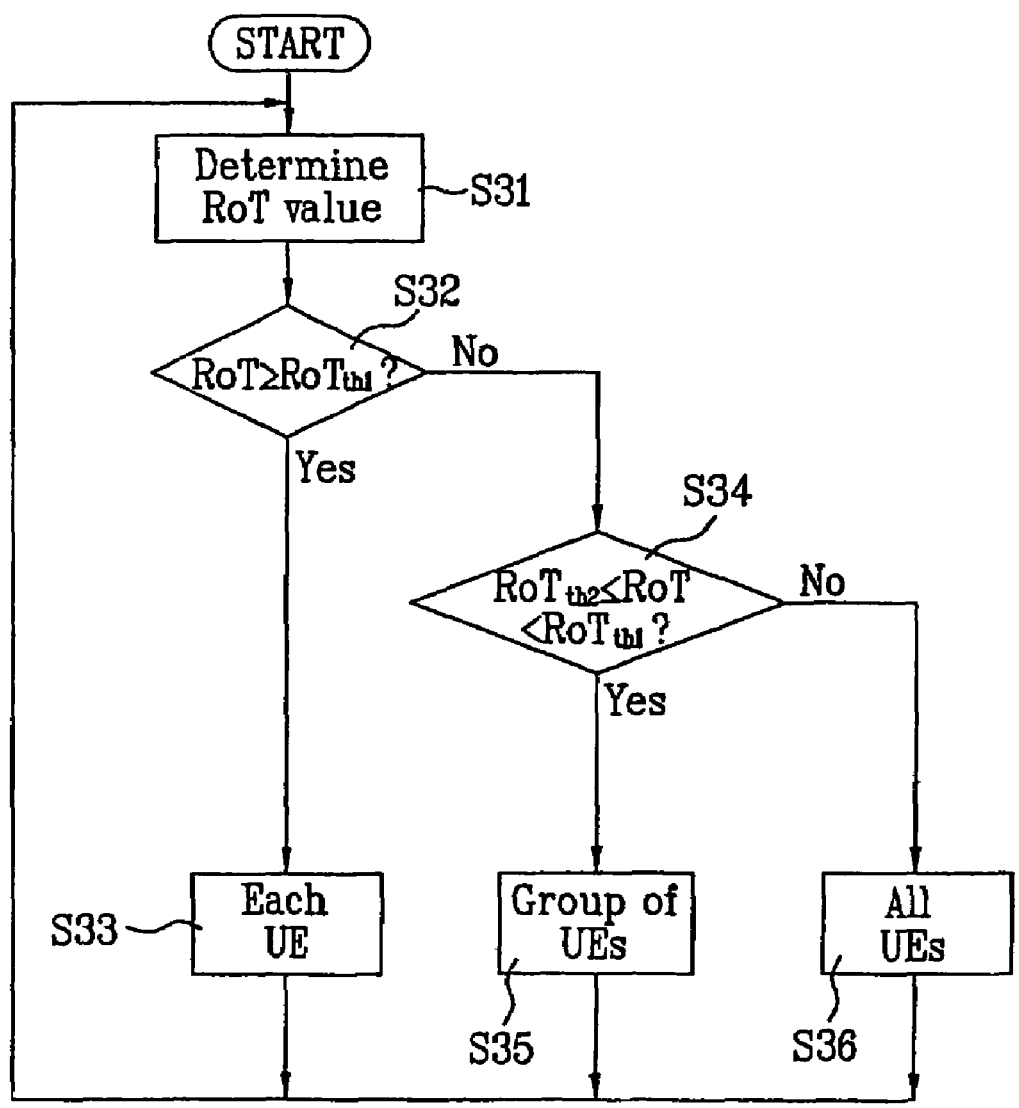
FIG. 3 is a flowchart for determining a method of transmitting a scheduling assignment.

In FIG. 3, an example having two critical values ($RoT_{th1}$, $RoT_{th2}$, except $RoT_{th1} > RoT_{th2}$) are used to further explain scheduling assignment. The first step (S31) begins by first determining RoT value at every TTI of scheduling assignment. The RoT value can be defined by calculating the power of receiving signals over thermal noise in the base station. After the RoT value is determined, the determined RoT value is compared with the $RoT_{th1}$ value (S32). Usually, the RoT value corresponds to noise/interference, hence when the noise/interference is low, the RoT value becomes large since the thermal noise compared to the power of receiving signal is small. On the contrary, if the noise/interference is high, the RoT value becomes small since the thermal noise compared to the power of receiving signal is large.

If the determined RoT value is larger or equal than the $RoT_{th1}$ value ($RoT \geq RoT_{th1}$), which denotes low noise/interference, a scheduling assignment is transmitted to each UE (S33). When the transmission of scheduling assignment is made, the UE ID is used to define the receiving UE, and the scheduling contents are used to transmit command for the UE to follow.

If the determined RoT value is larger than $RoT_{th1}$ value, the determined RoT value is then compared to the $RoT_{th2}$ value. Since it was determined in the previous step that the determined RoT value is larger than $RoT_{th1}$, Node B determines if the determined RoT value is smaller than or equal to the value of $RoT_{th2}$ ($RoT_{th2} \leq RoT < RoT_{th1}$) (S34). If so, the determined RoT value is smaller than $RoT_{th1}$ value but larger or equal to than $RoT_{th2}$ value. In such a case, the scheduling assignment(s) is/are transmitted to a group or groups of UEs, containing the UE ID and the scheduling contents (S35). The UE group IDs allow the UEs of the group to identify a scheduling assignment directed to them as a group. The UE group IDs can be pre-established using various techniques between Node B and the UEs.

If the determined RoT value is smaller than $RoT_{th2}$ ($RoT < RoT_{th2}$), which denotes high interference, therefore the low RoT value, the same scheduling assignment, including scheduling contents and an UE ID, is transmitted to all the UEs (S36). Using RoT value is one of many methods of determining the status of the uplink packet transmission channel. As mentioned above, other techniques such as SNR and SINR can also be used.

FIG. 1 shows a numerous scheduling assignment channels during different time frames per each channel. Here, each channel can transmit individual scheduling assignment as well as different sets of groups of scheduling assignments and the all the scheduling assignments grouped as one. In other words, different types of scheduling assignments are transmitted at different times.

As presented in FIG. 1, Ch-1-Ch-n are, for example, orthogonal variable spreading factor (OVSF) code channels. In particular, n represents number of UEs capable of performing simultaneous decoding operation. Furthermore, $SA_i$ (i=1–n) represents scheduling assignment transmitted to $i^{th}$ UE, SA-Gi (i=1–k) represents scheduling assignment transmitted to $i^{th}$ group of UEs, and SA-all represents scheduling assignment transmitted to all the UEs.

Figure 2:
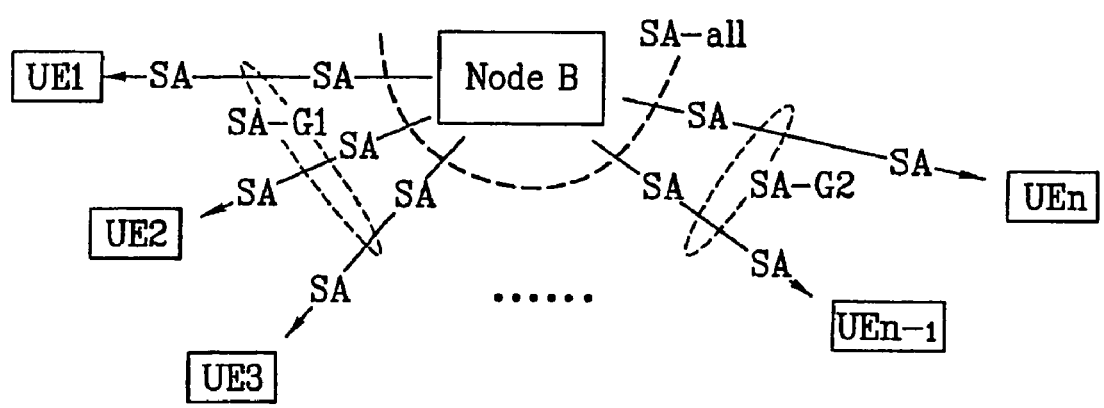
FIG. 2 illustrates grouped scheduling assignment channels.

FIG. 2 shows transmitting scheduling assignments to UEs as multiple groups or as a group consisting all the UEs. As discussed above, based on the noise/interference of the uplink packet transmission channel as determined by Node B, the scheduling assignment commands the uplink packet transmission.

As shown in FIG. 2, Node B can transmit scheduling assignments to n number of UEs in groups as indicated by SA-G1 and SA-G2. At the same time, scheduling assignments can be transmitted to all UEs simultaneously as indicated by SA-all. In transmitting scheduling assignments, specific UE ID(s) directed for specific group(s) of UEs or for all UEs are transmitted along with scheduling contents.

It is possible to transmit scheduling assignment to all the UEs using a separate or different channel than the channels used to transmit scheduling assignments to each UEs separately or to specific groups of UEs.

It is also possible to include in the scheduling assignment a command which grants or denies packet transmission. In other words, Node B determines either to grant or deny packet transmission depending on the status of channels. Subsequently, traffic congestion in the channels and shortage of resources can be alleviated, promoting efficiency of the entire system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of scheduling an uplink packet transmission channel in a base station (BS), the method comprising:

transmitting, by the BS, a scheduling assignment in an Enhanced Absolute Grant Channel (E-AGCH), wherein contents of the scheduling assignment comprises a scheduled power command for uplink packet transmission; and receiving, by the BS, uplink data packet on an Enhanced Uplink Dedicated Channel (E-DCH) according to the contents of the scheduling assignment, wherein the contents of the scheduling assignment further comprises one of a first identifier for a single user equipment (UE) or a second identifier for a plurality of UEs including the single UE, and wherein the each of the plurality UEs has the first identifier and the second identifier at a time for receiving the scheduling assignment in the E-AGCH.

2. The method of claim 1, further comprising:
   determining a status of the E-DCH; and
   determining whether the scheduling assignment is associated with the single UE or the plurality of UEs according to the status of the E-DCH.

3. The method of claim 1, wherein the scheduled power command defines a maximum amount of power that can be allotted for transmission of uplink packet transmission.

4. The method of claim 1, wherein
   the scheduling assignment is transmitted to the plurality of UEs via the E-AGCH when the scheduling assignment comprises the second identifier, and
   wherein the scheduling assignment is received and decoded by each of the plurality of UEs.

5. The method of claim 1
   wherein the scheduling assignment is transmitted to the single UE via the E-AGCH when the scheduling assignment comprises the first identifier.

6. The method of claim 1, wherein the E-ACGH is a shared channel.

7. The method of claim 2, wherein the status of the E-DCH is determined as a function of Rise over Thermal (RoT) value.

8. A method of scheduling an uplink packet transmission channel for user equipment (UE), the method comprising:
   receiving, by the UE, a scheduling assignment in an Enhanced Absolute Grant Channel (E-AGCH) using a first identifier for the UE and a second identifier for a plurality of UEs including the UE, wherein the scheduling assignment comprises a scheduled power command for uplink packet transmission and one of the first identifier or the second identifier;
   acquiring, by the UE, contents of the scheduling assignment; and
   transmitting, by the UE, uplink data packet on an Enhanced Uplink Dedicated Channel (E-DCH) according to the contents of the scheduling assignment,
   wherein the UE has the first identifier and the second identifier at a time.

9. The method of claim 8, wherein the scheduled power command defines a maximum amount of power that can be allotted for transmission of uplink packet transmission.

10. The method of claim 8, wherein the E-ACGH is a shared channel.

11. The method of claim 8, wherein the scheduling assignment is transmitted to the plurality of UEs via the E-AGCH when the scheduling assignment comprises the second identifier, and
   wherein the scheduling assignment is received and decoded by each of the plurality of UEs.

12. The method of claim 8, wherein the scheduling assignment is transmitted to the single UE via the E-AGCH when the scheduling assignment comprises the first identifier.

13. A method of scheduling an uplink packet transmission channel in a mobile communication system, the method comprising:
   a base station (BS) configured to transmit a scheduling assignment in an Enhanced Absolute Grant Channel (E-AGCH) for scheduling an Enhanced Uplink Dedicated Channel (E-DCH), and receive uplink data packet transmitted on the E-DCH; and
   a user equipment (UE) configured to receive the scheduling assignment, and transmit the uplink data packet on the E-DCH using contents of the scheduling assignment,
   wherein the content of the scheduling assignment includes a scheduled power command and one of a first identifier for the UE or a second identifier associated with the plurality of UEs including the UE,
   wherein the UE receives the scheduling assignment using the first identifier and the second identifier, and
   wherein the UE has the first identifier and the second identifier at a time for receiving the scheduling assignment in the E-AGCH.

14. A base station (BS) for scheduling an uplink packet transmission channel, the BS configured to: transmit a scheduling assignment in an Enhanced Absolute Grant Channel (E-AGCH), wherein contents of the scheduling assignment comprises a scheduled power command for uplink packet transmission; and
   receive uplink data packet on an Enhanced Uplink Dedicated Channel (E-DCH) according to the contents of the scheduling assignment,
   wherein the contents of the scheduling assignment further comprises one of a first identifier for a single user equipment (UE) or a second identifier for a plurality of UEs including the single UE, and
   wherein the each of the plurality UEs has the first identifier and the second identifier at a time for receiving the scheduling assignment in the E-AGCH.

15. The base station of claim 14, wherein the BS further configured to:
   determine a status of the E-DCH; and
   determine whether the scheduling assignment is associated with the single UE or the plurality of UEs according to the status of the E-DCH,
   wherein the status of the E-DCH is determined as a function of Rise over Thermal (RoT) value.

16. The base station of claim 14, wherein the scheduling assignment is transmitted to the plurality of UEs via the E-AGCH when the scheduling assignment comprises the second identifier, and
   the scheduling assignment is transmitted to the single UE via the E-AGCH when the scheduling assignment comprises the first identifier.

17. A user equipment (UE) for receiving a scheduling assignment for an uplink packet transmission channel, the UE configured to:
   receive a scheduling assignment in an Enhanced Absolute Grant Channel (E-AGCH) using a first identifier for the UE and a second identifier for a plurality of UEs including the UE, wherein the scheduling assignment comprises a scheduled power command for uplink packet transmission and one of the first identifier or the second identifier;
   acquire contents of the scheduling assignment; and
   transmit uplink data packet on an Enhanced Uplink Dedicated Channel (E-DCH) according to the contents of the scheduling assignment,
   wherein the UE has the first identifier and the second identifier at a time.

18. The user equipment of claim 17, wherein the scheduled power command defines a maximum amount of power that can be allotted for transmission of uplink packet transmission.

19. The user equipment of claim 17, wherein the scheduling assignment is transmitted to the plurality of UEs via the E-AGCH when the scheduling assignment comprises the second identifier, and
   the scheduling assignment is transmitted to the single UE via the E-AGCH when the scheduling assignment comprises the first identifier.

* * * * *